United States Patent [19]

Amann

[11] 4,161,627

[45] Jul. 17, 1979

[54] METHOD OF AND SYSTEM FOR GENERATING DIGITAL TEST SIGNALS

[75] Inventor: Bertram Amann, Eningen u.A., Fed. Rep. of Germany

[73] Assignee: Wandel & Goltermann, Eningen u.A., Fed. Rep. of Germany

[21] Appl. No.: 865,501

[22] Filed: Dec. 29, 1977

[30] Foreign Application Priority Data

Dec. 30, 1976 [DE] Fed. Rep. of Germany ....... 2659512

[51] Int. Cl.$^2$ ............................ H04J 3/14; H04L 3/00
[52] U.S. Cl. ............................................... 179/15 BF
[58] Field of Search ..................... 179/175.3 R, 15 BF, 179/15 AP; 307/235 A

[56] References Cited

U.S. PATENT DOCUMENTS

| 3,798,635 | 3/1974 | Candiani | 179/15 BF |
| 3,911,225 | 10/1975 | Mignon | 179/15 BF |

Primary Examiner—Thomas A. Robinson
Attorney, Agent, or Firm—Karl F. Ross

[57] ABSTRACT

To test the performance of a PCM terminal operating in the TDM mode, a simulated message or noise signal is generated by extracting a recurrent sequence of code words from a read-only memory, the stored code words representing a set of values logarithmically related to sucdessive amplitudes of a sine wave or other periodic oscillation to be reproduced. These words are read out at a fixed scanning frequency $f_o$ but with skipping of (p-1) memory stages if a signal frequency $pf_o$ is to be simulated. A volume selector generates supplemental code words which are additively or subtractively combined with the extracted code words to simulate a desired voltage level. The resulting code words are compressed in a code converter in which the quantum steps of the segments of a compander characteristic, conforming to the chosen logarithmic function, are stored in another read-only memory.

10 Claims, 4 Drawing Figures

FIG. 4 — "μ" code

| a | b | c | d | dB | A | B | C | W | X | Y | Z |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 1 |   | 0 | 0 | 0 |   |   |   |   |
| 0 | 0 | 1 | 0 |   | 0 | 0 | 1 |   |   |   |   |
| 0 | 0 | 1 | 1 |   | 0 | 1 | 0 |   |   |   |   |
| 0 | 1 | 0 | 0 |   | 0 | 1 | 1 | FROM ROM 16 | | | |
| 0 | 1 | 0 | 1 |   | 1 | 0 | 0 |   |   |   |   |
| 0 | 1 | 1 | 0 |   | 1 | 0 | 1 |   |   |   |   |
| 0 | 1 | 1 | 1 |   | 1 | 1 | 0 |   |   |   |   |
| 1 | 0 | 0 | 0 | -48.16 | 1 | 1 | 1 |   |   |   |   |
| 1 | 0 | 0 | 1 |   | 1 | 1 | 1 | 1 | 1 | 1 | 1 |
| 1 | 0 | 1 | 0 |   | 1 | 1 | 1 | 1 | 1 | 1 | 1 |
| 1 | 0 | 1 | 1 |   | 1 | 1 | 1 | 1 | 1 | 1 | 1 |
| 1 | 1 | 0 | 0 |   | 1 | 1 | 1 | 1 | 1 | 1 | 1 |
| 1 | 1 | 0 | 1 |   | 1 | 1 | 1 | 1 | 1 | 1 | 1 |
| 1 | 1 | 1 | 0 |   | 1 | 1 | 1 | 1 | 1 | 1 | 1 |
| 1 | 1 | 1 | 1 |   | 1 | 1 | 1 | 1 | 1 | 1 | 1 |

FIG. 3 — "A" code

| a | b | c | d | dB | A | B | C | W | X | Y | Z |
|---|---|---|---|---|---|---|---|---|---|---|---|
| 1 | 1 | 1 | 1 | 0 | 1 | 1 | 1 | 1 | 1 | 1 | 1 |
| 1 | 1 | 1 | 0 |   | 1 | 1 | 1 |   |   |   |   |
| 1 | 1 | 0 | 1 |   | 1 | 1 | 0 |   |   |   |   |
| 1 | 1 | 0 | 0 |   | 1 | 0 | 1 | FROM ROM 16 | | | |
| 1 | 0 | 1 | 1 |   | 1 | 0 | 0 |   |   |   |   |
| 1 | 0 | 1 | 0 |   | 0 | 1 | 1 |   |   |   |   |
| 1 | 0 | 0 | 1 |   | 0 | 1 | 0 |   |   |   |   |
| 1 | 0 | 0 | 0 | -42.14 | 0 | 0 | 1 |   |   |   |   |
| 0 | 1 | 1 | 1 |   | 0 | 0 | 0 | \multicolumn{4}{c}{1 ÷ 2} |
| 0 | 1 | 1 | 0 |   | 0 | 0 | 0 | \multicolumn{4}{c}{1 ÷ 4} |
| 0 | 1 | 0 | 1 |   | 0 | 0 | 0 | \multicolumn{4}{c}{1 ÷ 8} |
| 0 | 1 | 0 | 0 |   | 0 | 0 | 0 | \multicolumn{4}{c}{1 ÷ 16} |
| 0 | 0 | 1 | 1 | -72.25 | 0 | 0 | 0 | \multicolumn{4}{c}{1 ÷ 32} |
| 0 | 0 | 1 | 0 |   | 0 | 0 | 0 | 0 | 0 | 0 | 0 |
| 0 | 0 | 0 | 1 |   | 0 | 0 | 0 | 0 | 0 | 0 | 0 |
| 0 | 0 | 0 | 0 |   | 0 | 0 | 0 | 0 | 0 | 0 | 0 |

METHOD OF AND SYSTEM FOR GENERATING DIGITAL TEST SIGNALS

FIELD OF THE INVENTION

My present invention relates to a method of and a system for generating digital signals designed to test a processor of PCM messages, such as a decoder or a demultiplexer, these signals simulating a periodic oscillation of selectable amplitude and possibly frequency.

BACKGROUND OF THE INVENTION

In commonly owned British Pat. No. 1,472,464 there has been described a digital signal generator of this type comprising a memory which stores a number of sets of binary code words whose numerical values are representative of successive amplitude samples of a sine wave to be simulated, the various sets corresponding to different frequencies and/or amplitudes. A selected sequence of code words, read out from its store, is iteratively transmitted to a load to be tested for its performance, in terms of residual attenuation, frequency response, level dependence and cross-talk, without the need for a source of adjustable analog signals.

OBJECTS OF THE INVENTION

An object of my present invention is to provide an improved system of this type requiring a considerably reduced number of memory cells for the storage of code words of selectable amplitude and/or frequency.

A related object is to provide a method of quickly and easily modifying the simulated amplitude level represented by a set of stored code words.

SUMMARY OF THE INVENTION

In accordance with my present invention, a series of basic binary code words are formed by quantizing a set of numerical values, representative of successive amplitude samples of a cycle of an oscillation to be simulated, in conformity with a pseudo-logarithmic compression characteristic of a type conventionally used in companding systems. A supplemental binary code word, representing a quantized multiplication factor, is generated and algebraically added to each of the basic code words, the resulting code words being then sequentially and iteratively transmitted to a load such as a PCM terminal.

The usual compander characteristics are based on various logarithmic functions including the so-called "$\mu$" code, utilized in the United States by the Bell System, and the so-called "A" code described in "Principles of Pulse-Code Modulation" by K. W. Cattermole, London, Iliffe Books Ltd. The "A" code, recommended by CCITT, is of the form $$y = K \cdot (1 + \log A \cdot x),$$

where K and A are constants; the "$\mu$" code is given by $$y = K_1 \cdot \ln(1 + \mu \cdot x),$$

$K_1$ and $\mu$ being constants. The magnitude of x, which represents the original signal amplitude, changes discontinuously in binary increments, corresponding to steps 6.02 dB tantamount to an energy factor of 2. These steps appear in the compression characteristic as straight-line segments of different slope forming a broken curve; each curve segment is linearly subdivided into a multiplicity of quantum steps. Generally, a code word representing any of the signal amplitudes so quantized consists of eight bits, namely four lower-ranking quantum bits, three higher-ranking segment bits and one sign bit. Thanks to the logarithmic function, a change in amplitude can be expressed by algebraic summing, i.e. by additively or subtractively combining a basic multibit code word with a supplemental multibit code word in the aforestated manner.

Thus, a given type of oscillation (such as a sine wave) can be simulated by a single set of code words conforming to a predetermined signal amplitude which can be modified at will by the additive or subtractive superposition of the supplemental code word generated by a volume selector.

If frequency selection is also desired, some of the stored code words may be skipped in a manner known per se during iterative readout of a sequence of such code words simulating a recurrent wave cycle.

According to a more particular feature of my invention, the basic and supplemental code words have a larger number of segment and quantum bits than are needed in the final sequence to be transmitted to the load, thus reducing the errors due to the suppression of the least-significant bits. For this purpose I prefer to use a code converter comprising another memory storing bit groups for the final code words, to be read out under the control of the quantum bits of the code words synthesized from the basic and supplemental code words. The highest-ranking segment bit of the synthesized code words, or a combination of all these segment bits, may also be used to select identical (i.e. all-zero or all-one) quantum bits at the lower or the upper end of the operating range.

BRIEF DESCRIPTION OF THE DRAWING

The above and other features of my invention will now be described in detail with reference to the accompanying drawing in which:

FIGS. 3 and 4 are tables relating to the operation of the system.

SPECIFIC DESCRIPTION

Figure 1:
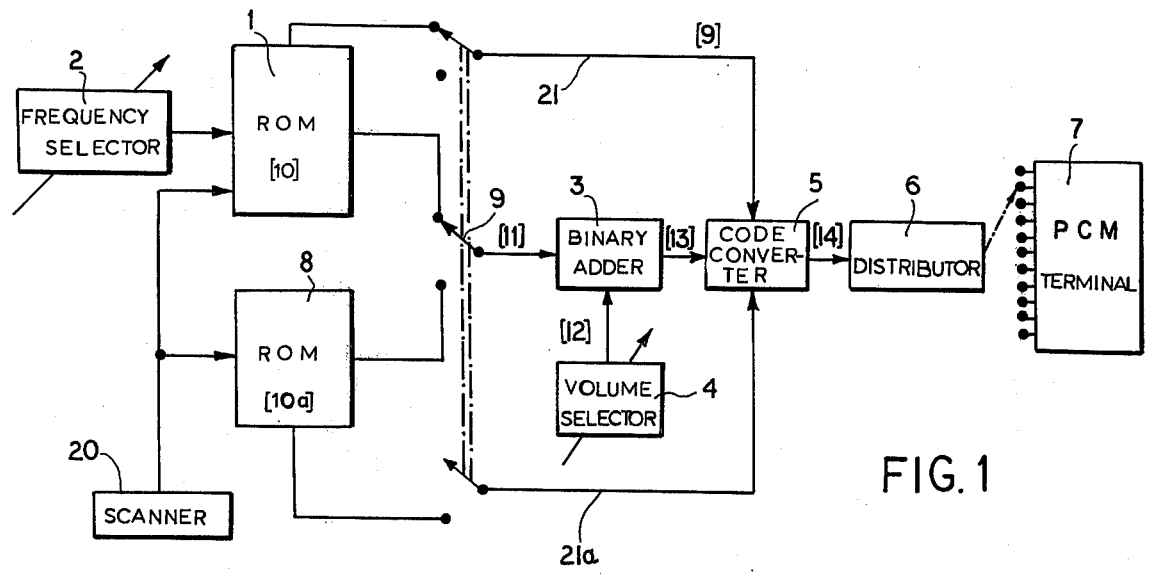
FIG. 1 is a block diagram of a digital-signal generator according to my invention.

In FIG. 1 I have shown a read-only memory 1 in which there are stored a series of basic binary code words with numerical values representative of successive amplitude samples of an oscillatory cycle, such as that of a sine wave, quantized in the aforedescribed manner. A second read-only memory 8 stores a similar set of basic code words simulating a pseudo-random noise signal.

A scanner 20 sequentially addresses, with a recurrence frequency $f_o$, the several cells of the two memories 1 and 8 for periodically extracting the code words stored therein. Depending on the position of a selector switch 9, either a recurring series of code words 10 from memory 1 (simulating a sine wave) or a series of code words 10a from memory 8 (simulating white noise) is fed to an input of a binary adder 3. In the illustrated position of switch 9, the adder receives code words 11 lacking their original sign bit S. The latter is delivered directly, via a connection 21, to a code converter 5 connected to the output of adder 3. An analogous connection 21a delivers the sign bit of a word 10a to code converter 5 in the alternate position of switch 9. Memory 8 may include means for modifying the read-out words in consecutive scanning cycles according to a pseudo-random pattern.

A frequency selector 2 works into a control input of memory 1 to block the scanning of certain cells in the series, i.e. groups of (p-1) cells if the extracted codeword series is to simulate a signal of frequency $pf_c$. To simulate a frequency $2f_c$, for example, only every other stored code word is read out.

A volume selector 4 generates a supplemental code word 12 which is the quantized equivalent of a multiplication factor to be fed into a second input of adder 3 for algebraic summing with each basic code word 11 arriving from memory 1. Depending on whether the multiplication factor is greater or smaller than unity, this supplemental code word 12 is additively or subtractively superimposed upon the successive basic code words.

As will be apparent from the formulas given hereinabove, the two code words 11 and 12 can be summed directly in the case of the "A" code whereas an additive shift is required within selector 4 in the case of the "$\mu$" code. The result of the addition (or subtraction) is a further code word 13 delivered to converter 5 where the number of its bits is reduced, as described hereinafter with reference to FIG. 2. The final code word 14, completed with the inclusion of the sign bit S from memory 1, is transmitted to a distributor 6 feeding it to a PCM terminal 7 for the testing of selected time slots.

Figure 2:
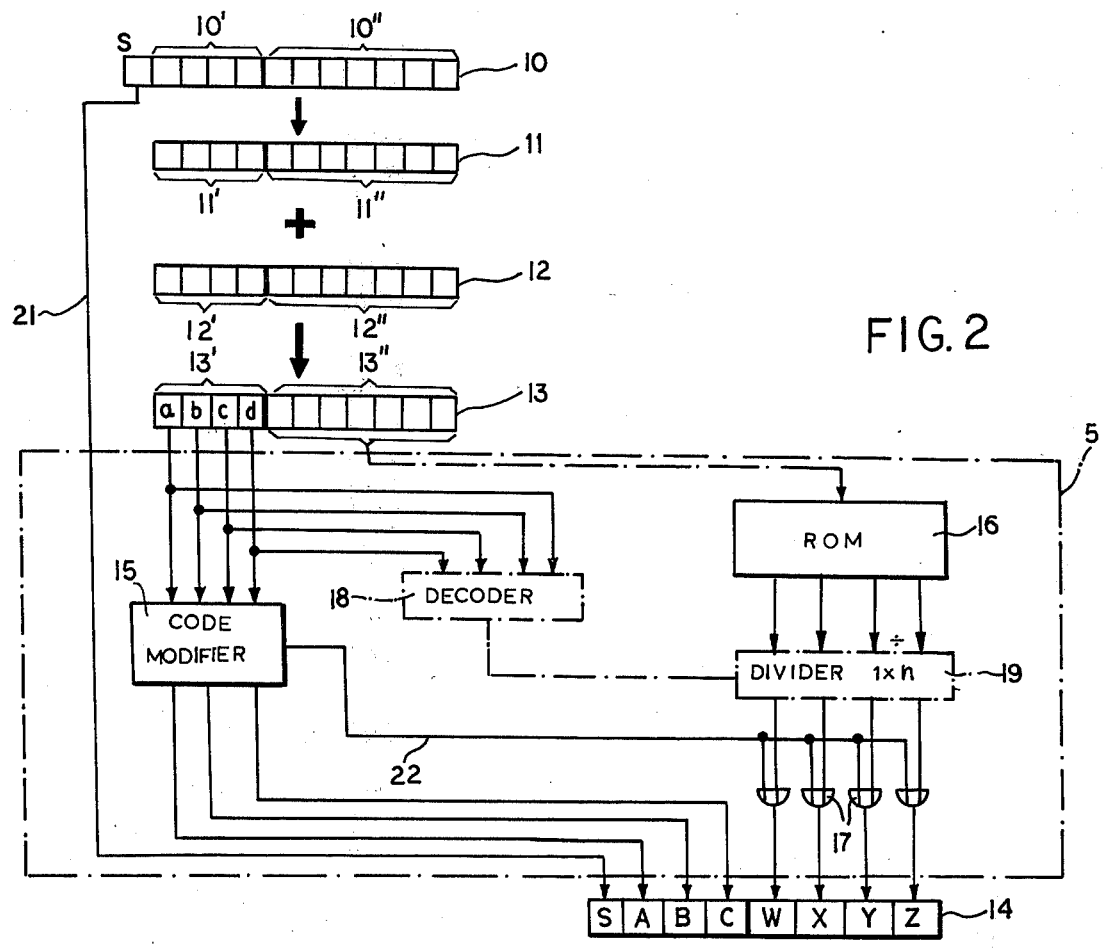
FIG. 2 is a flow chart showing the progression of code words through the system of FIG. 1.

Reference will now be made to FIG. 2 showing details of the various code words 10–14 referred to above. Basic code word 10 is seen to consist of seven quantum bits 10'', four segment bits 10' and the sign bit S. Code word 11, identical with code word 10 except for the missing sign bit, consists of four segment bits 11' and seven quantum bits 11''. Supplemental code word 12 has the same structure as code word 11, with four segment bits 12' and seven quantum bits 12''. An intermediate code word 13, resulting from the algebraic summing of words 11 and 12, is divided into a group of segment bits 13', individually designated a, b, c and d, and a group of seven quantum bits 13'' which are collectively fed to a read-only memory 16 within converter 5.

Memory 16 stores a multiplicity of four-bit groups which can be selectively read out under the control of bits 13'' of word 13 addressing that memory. The selected group of bits pass through respective OR gates 17 to become the four lowest-ranking bits W, X, Y, Z of outgoing code word 14. Bits a, b, c and d of word 13 enter a code modifier 15 which derives from them the three segment bits A, B and C of word 14 just following the sign bit S arriving over connection 21. Code modifier 15 also has an output lead 22 which is energized in the presence of a carry in bit position a of group 13', as more fully described hereinafter; lead 22 terminates at the other inputs of OR gates 17.

Also shown in FIG. 2, in phantom lines, is a decoder 18 connected in parallel with code modifier 15 to receive the bits 13' of code word 13, this decoder controlling a divider 19 (likewise illustrated in phantom lines) inserted between memory 16 and OR gates 17. Units 18 and 19 are used only with an "A" code, as will be apparent hereinafter.

In FIG. 3 I have indicated one possible mode of translating the four bits a, b, c, d of group 13' into three segment bits A, B and C of word 14. It is here assumed that with a maximum signal level, corresponding to an attenuation of 0 dB, bits 13' all have the logic value "1" and that this amplitude lies above the test range. Unit 15 (FIG. 2) then energizes all its output leads, including lead 22, so that all bits A, B, C, W, X, Y, Z of word 14 assume the value "1."

With lower amplitudes, down to a level of $-42.14$ dB indicated by bits 1-0-0-0 in group 13', bits W, X, Y and Z have the values read out from memory 16 under the control of bit group 13'.

At still lower levels, marked by a carry "0" in bit position a, unit 19 goes into action to divide the numerical values of the bit groups extracted from memory 16 in a ratio 1:n with n varying from 2 at the 9th segmental level to 32 at the 13th level which corresponds to $-72.25$ dB. This division brings about a linearization of the compressed amplitudes in the lowest subrange in which $A=B=C=0$. The three lowermost levels all give rise to a row of zeroes in the positions of the segment and quantum bits of code word 14.

FIG. 4 shows a similar set of binary values for the "$\mu$" code. Here the top level of 0 dB is marked by an all-zero code, followed by eight operative levels in which bit groups are read out from memory 16. Beyond the 9th segmental level, i.e. below $-48.16$ dB when the carry "1" appears in bit position a, the system does not differentiate and the seven segment and quantum bits of word 14 all have the value "1."

It will be apparent that other logarithmic or quasi-logarithmic codes can be similarly handled. In each instance, the algebraic summing operation in adder 3 replaces the more complex and time-consuming multiplications or divisions that would otherwise be necessary. Thus, my improved system allows the processing of the code words within the usual 125-$\mu$s sampling intervals or time slots of a telephone or other telecommunication system of the PCM/TDM type even if only relatively slow-acting microprocessors are available.

It will be understood that the various units shown in FIGS. 1 and 2 need not be physically distinct but may be part of the software of a microcomputer.

I claim:

1. A method of generating digital test signals simulating an oscillation of pseudo-logarithmically compressed selectable amplitude, comprising the steps of:
   establishing a set of numerical values representative of successive amplitude samples of a cycle of an oscillation to be simulated;
   quantizing said numerical values in conformity with a pseudo-logarithmic compression characteristic to form a series of basic multibit code words;
   generating a supplemental multibit code word representing a quantized multiplication factor;
   algebraically adding said supplemental code word to each of said basic code words to form a sequence of resulting multibit code words; and
   transmitting said sequence to a load to be tested.

2. A method as defined in claim 1, comprising the further step of iteratively reading out said basic code words at a fixed scanning frequency from a store before adding said supplemental code word thereto.

3. A method as defined in claim 2, comprising the further step of skipping certain of the stored code words in the readout to simulate an oscillation frequency which is a multiple of said scanning frequency.

4. A method as defined in claim 1 wherein said basic and resulting code words each include a predetermined number of bits including a group of lower-ranking quantum bits, a group of higher-ranking segment bits and a sign bit, comprising the further step of directly transferring the sign bit of any basic code word to a corresponding bit position in the respective resulting code word.

5. A method as defined in claim 4 wherein an intermediate code word is formed by algebraically adding the quantum and segment bits of each basic code word to corresponding bits of said supplemental code word, comprising the further step of compressing said intermediate code word into a reduced number of quantum and segment bits of a resulting code word.

6. A method as defined in claim 5 wherein the compression of said intermediate code word involves the selection of pre-existing quantum bits for the resulting code word under the control of the quantum bits and at least the highest-ranking segment bit of the respective basic code word.

7. A system for generating digital test signals simulating an oscillation of pseudo-logarithmically compressed selectable amplitude, comprising:
storage means containing a series of basic multibit code words with numerical values representative of successive amplitude samples, quantized in conformity with a pseudo-logarithmic compression characteristic, of a cycle of an oscillation to be simulated;
volume-selecting means operable to generate a supplemental multibit code word representing a quantized multiplication factor;
binary summing means with inputs connected to said storage means and to said volume-selecting means for algebraically adding said supplemental code word to each of said basic code words sequentially read out from said storage means, thereby forming a sequence of further multibit code words; and
output means connected to said summing means for transmitting said sequence to a load to be tested.

8. A system as defined in claim 7 wherein said storage means includes a first read-only memory containing basic code words representative of a sine wave and a second read-only memory containing basic code words representative of pseudo-random noise, further comprising switchover means for selectively connecting either of said read-only memories to said summing means.

9. A system as defined in claim 7 wherein said output means comprises a code converter compressing said further code words into final code words with a reduced number of bits.

10. A system as defined in claim 9 wherein said code converter includes a read-only memory storing bit groups for said final code words extractable under the control of said further code words.

* * * * *